(12) United States Patent
Walton (10) Patent No.: US 9,428,370 B1
(45) Date of Patent: Aug. 30, 2016

(54) SHEAVE AND SHEAVE SYSTEM (71) Applicant: Stewart Walton, Mystic, CT (US)

(72) Inventor: Stewart Walton, Mystic, CT (US)

( * ) Notice: Subject to any disclaimer, the term of this patent is extended or adjusted under 35 U.S.C. 154(b) by 0 days.

(21) Appl. No.: 14/622,462

(22) Filed: Feb. 13, 2015

(51) Int. Cl.
*B66D 1/36* (2006.01)
*F16H 55/36* (2006.01)

(52) U.S. Cl.
CPC ............... *B66D 1/36* (2013.01); *F16H 55/36* (2013.01)

(58) Field of Classification Search
CPC ... B66D 3/04; B66D 2700/026; F16H 55/36; F16H 55/42; F16H 55/44; F16H 55/46; F16H 55/48; F16H 55/49; F16H 55/50; F16H 55/54; F16H 55/56
See application file for complete search history.

(56) References Cited

U.S. PATENT DOCUMENTS

| | | | | |
|---|---|---|---|---|
| 1,372,900 A * | 3/1921 | Olinger | ............... | B66D 3/04 16/215 |
| 1,930,626 A * | 10/1933 | Schwemlein | ............ | B66D 3/04 384/584 |
| 2,452,458 A | 10/1948 | Hahn | | |
| 2,710,762 A * | 6/1955 | Whitaker | ............... | F16D 1/096 403/16 |
| 2,924,431 A * | 2/1960 | Chadbourne | ............ | B66D 3/04 254/409 |
| 3,055,639 A * | 9/1962 | Chaft | ............... | B66D 3/04 254/394 |
| 3,108,483 A | 10/1963 | Williams | | |
| 3,114,271 A * | 12/1963 | Davis | ............... | F16H 55/56 403/256 |
| 3,137,177 A | 6/1964 | Barnet | | |
| 3,332,665 A * | 7/1967 | Bruns | ............... | B66D 3/06 187/254 |
| 3,337,188 A * | 8/1967 | Manson | ............... | B66D 3/04 254/412 |
| 3,367,199 A * | 2/1968 | Dankowski | ............ | F16H 55/42 474/168 |
| 3,746,413 A * | 7/1973 | Nishikawa | ............ | F16C 13/006 384/542 |
| 3,822,457 A * | 7/1974 | Frost | ............... | B21D 53/261 219/119 |
| 4,037,486 A | 7/1977 | Schultz, Jr. | | |
| 4,197,756 A | 4/1980 | Yaros | | |
| 5,398,433 A * | 3/1995 | Dretzka | ............... | E02F 3/58 212/100 |
| 5,538,224 A * | 7/1996 | Powell | ............... | B66D 3/04 254/406 |
| 5,788,576 A * | 8/1998 | Varin | ............... | F16D 3/02 464/160 |
| 6,405,833 B1 | 6/2002 | Baranda | | |
| 6,638,390 B1 | 10/2003 | Sizelove | | |
| 7,614,611 B1 | 11/2009 | Walton | | |
| 2001/0016529 A1* | 8/2001 | Kawachi | ............ | F16H 35/10 474/94 |
| 2004/0178398 A1 | 9/2004 | Miller | | |
| 2005/0221932 A1* | 10/2005 | Umemura | ............ | B29C 45/14221 474/70 |
| 2011/0207566 A1* | 8/2011 | Brind'Amour | ............ | F16H 7/0827 474/46 |
| 2013/0331215 A1* | 12/2013 | Hewitt | ............... | F16H 55/44 474/174 |

* cited by examiner

*Primary Examiner* — Emmanuel M Marcelo
(74) *Attorney, Agent, or Firm* — Michael A. Blake (57) ABSTRACT

A sheave comprising: a sheave body, the sheave body comprising: a groove; a sheave body outer diameter of $OD_H$; a sheave bore, the sheave bore having a sheave body inner diameter $ID_{HN}$, a sheave bore width of $W_{SB}$ and a sheave bore axis; a first circumferential surface that generally encircles the sheave bore on one side of the sheave body, and is generally orthogonal to the sheave bore axis; a second circumferential surface that generally encircles the sheave bore on an opposite side of the sheave body, and is generally orthogonal to the sheave bore axis; a two piece flanged adapter removeably and fixedly attached to the sheave bore, the two piece flanged adapter comprising: a first piece, the first piece comprising: a first piece adapter bore, with a first adapter bore inner diameter of $ID_{SS}$; a first inner flange that generally encircles the first piece adapter bore; a first inner flange surface; a second piece; the second piece comprising: a second piece adapter bore, with a second adapter bore inner diameter of $ID_{SS}$, and the second adapter bore $ID_{SS}$ is equal to the first adapter bore $ID_{SS}$; a second inner flange that generally encircles the second piece adapter bore; a second inner flange surface, where when the two piece flanged adapter is installed in the sheave bore, the first inner flange surface abuts the first circumferential surface, the second inner flange surface abuts the second circumferential surface, and the first and second inner flange surfaces are orthogonal to the shave bore axis, the first piece adapter bore abuts the second piece adapter bore and forms a single adapter bore, and the single adapter bore has a width of $W_{AB}$, and the two piece flanged adapter has an outer diameter of $OD_{SS}$, and $OD_{SS}$ is about equal to $ID_{HN}$. A sheave system comprising: a first grooved sheave, the first grooved sheave comprising: an outer diameter of a first value; a groove with a first groove size; a sheave bore with a bore diameter of a fourth value and a bore width of a fifth value; a sheave axis located in the center of the sheave bore; a first circumferential surface that generally encircles the sheave bore on one side of the first grooved sheave, and is generally orthogonal to the sheave axis; a second circumferential surface that generally encircles the sheave bore on an opposite side of the first grooved sheave, and is generally orthogonal to the sheave axis; a second grooved sheave, the second grooved sheave comprising: an outer diameter of a second value; a groove with a second groove size; a sheave bore with a bore diameter of a fourth value and a bore width of a sixth value; a sheave axis located in the center of the sheave bore; a third circumferential surface that generally encircles the sheave bore on one side of the second grooved sheave, and is generally orthogonal to the sheave axis; a fourth circumferential surface that generally encircles the sheave bore on an opposite side of the second grooved sheave, and is generally orthogonal to the sheave axis; a third grooved sheave, the third grooved sheave comprising: an outer diameter of a third value; a groove with a third groove size; a sheave bore with a bore diameter of a fourth value and a bore width of a seventh value; a sheave axis located in the center of the sheave bore; a fifth circumferential surface that generally encircles the sheave bore on one side of the third grooved sheave, and is generally orthogonal to the sheave axis; a sixth circumferential surface that generally encircles the sheave bore on an opposite side of the third grooved sheave, and is generally orthogonal to the sheave axis; a first two piece flanged adapter removeably and fixedly attached to any of the sheave bores of the first through third grooved sheaves, the two piece flanged adapter comprising: a first piece, the first piece comprising: a first piece adapter bore, with a first adapter bore inner diameter of IDSS; a first inner flange that generally encircles the first piece adapter bore; a first inner flange surface; a second piece; the second piece comprising: a second piece adapter bore, with a second adapter bore inner diameter of $ID_{SS}$, and the second $ID_{SS}$ is equal to the first $ID_{SS}$; a second inner flange that generally encircles the second piece adapter bore; a second inner flange surface, where when the two piece flanged adapter is installable in any of the first through third sheave bores, the first inner flange surface abuts the first, third, or fifth circumferential surface, the second inner flange surface abuts the second, fourth, or sixth circumferential surface, and the first and second inner flange surfaces are orthogonal to the sheave bore axis, the first piece adapter bore abuts the second piece adapter bore and forms a single adapter bore, and the single adapter bore has a width of $W_{AB}$, and the two piece flanged adapter has an outer diameter of $OD_{SS}$, and $OD_{SS}$ is about equal to a fourth value.

6 Claims, 9 Drawing Sheets

SHEAVE AND SHEAVE SYSTEM

TECHNICAL FIELD

This invention relates generally to a sheave and a sheave system, and more particularly to a sheave and sheave system that can be easily adapted to various requirements of users.

BACKGROUND

Sheaves are grooved wheels or pulleys used with rope, wire or chain. Sheaves are often used to change the direction and point of application of pulling force. Selecting sheaves requires an analysis of product specifications, including but not limited to: cable size, outer diameter (OD) of the sheave, the material the sheave is to be made out of, the bore size, the sheave body width, the type of groove, the type and size and bearing that fits in the bore, including the width of the bearing. Manufacturing and supplying the properly specified sheaves to a customer may take anywhere from 4 to 26 weeks.

Accordingly, there is a need for a sheave that can be provided to customer with shorter lead times and or lower inventory costs.

SUMMARY

The invention relates to a sheave comprising: a sheave body, the sheave body comprising: a groove; a sheave body outer diameter of $OD_H$; a sheave bore, the sheave bore having a sheave body inner diameter $ID_{HN}$, a sheave bore width of $W_{SB}$ and a sheave bore axis; a first circumferential surface that generally encircles the sheave bore on one side of the sheave body, and is generally orthogonal to the sheave bore axis; a second circumferential surface that generally encircles the sheave bore on an opposite side of the sheave body, and is generally orthogonal to the sheave bore axis; a two piece flanged adapter removeably and fixedly attached to the sheave bore, the two piece flanged adapter comprising: a first piece, the first piece comprising: a first piece adapter bore, with a first adapter bore inner diameter of $ID_{SS}$; a first inner flange that generally encircles the first piece adapter bore; a first inner flange surface; a second piece; the second piece comprising: a second piece adapter bore, with a second adapter bore inner diameter of $ID_{SS}$, and the second adapter bore $ID_{SS}$ is equal to the first adapter bore $ID_{SS}$; a second inner flange that generally encircles the second piece adapter bore; a second inner flange surface, where when the two piece flanged adapter is installed in the sheave bore, the first inner flange surface abuts the first circumferential surface, the second inner flange surface abuts the second circumferential surface, and the first and second inner flange surfaces are orthogonal to the shave bore axis, the first piece adapter bore abuts the second piece adapter bore and forms a single adapter bore, and the single adapter bore has a width of $W_{AB}$, and the two piece flanged adapter has an outer diameter of $OD_{SS}$, and $OD_{SS}$ is about equal to $ID_{HN}$.

The invention also relates to a sheave system comprising: a first grooved sheave, the first grooved sheave comprising: an outer diameter of a first value; a groove with a first groove size; a sheave bore with a bore diameter of a fourth value and a bore width of a fifth value; a sheave axis located in the center of the sheave bore; a first circumferential surface that generally encircles the sheave bore on one side of the first grooved sheave, and is generally orthogonal to the sheave axis; a second circumferential surface that generally encircles the sheave bore on an opposite side of the first grooved sheave, and is generally orthogonal to the sheave axis; a second grooved sheave, the second grooved sheave comprising: an outer diameter of a second value; a groove with a second groove size; a sheave bore with a bore diameter of a fourth value and a bore width of a sixth value; a sheave axis located in the center of the sheave bore; a third circumferential surface that generally encircles the sheave bore on one side of the second grooved sheave, and is generally orthogonal to the sheave axis; a fourth circumferential surface that generally encircles the sheave bore on an opposite side of the second grooved sheave, and is generally orthogonal to the sheave axis; a third grooved sheave, the third grooved sheave comprising: an outer diameter of a third value; a groove with a third groove size; a sheave bore with a bore diameter of a fourth value and a bore width of a seventh value; a sheave axis located in the center of the sheave bore; a fifth circumferential surface that generally encircles the sheave bore on one side of the third grooved sheave, and is generally orthogonal to the sheave axis; a sixth circumferential surface that generally encircles the sheave bore on an opposite side of the third grooved sheave, and is generally orthogonal to the sheave axis; a first two piece flanged adapter removeably and fixedly attached to any of the sheave bores of the first through third grooved sheaves, the two piece flanged adapter comprising: a first piece, the first piece comprising: a first piece adapter bore, with a first adapter bore inner diameter of IDSS; a first inner flange that generally encircles the first piece adapter bore; a first inner flange surface; a second piece; the second piece comprising: a second piece adapter bore, with a second adapter bore inner diameter of $ID_{SS}$, and the second $ID_{SS}$ is equal to the first $ID_{SS}$; a second inner flange that generally encircles the second piece adapter bore; a second inner flange surface, where when the two piece flanged adapter is installable in any of the first through third sheave bores, the first inner flange surface abuts the first, third, or fifth circumferential surface, the second inner flange surface abuts the second, fourth, or sixth circumferential surface, and the first and second inner flange surfaces are orthogonal to the sheave bore axis, the first piece adapter bore abuts the second piece adapter bore and forms a single adapter bore, and the single adapter bore has a width of $W_{AB}$, and the two piece flanged adapter has an outer diameter of $OD_{SS}$, and $OD_{SS}$ is about equal to a fourth value.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
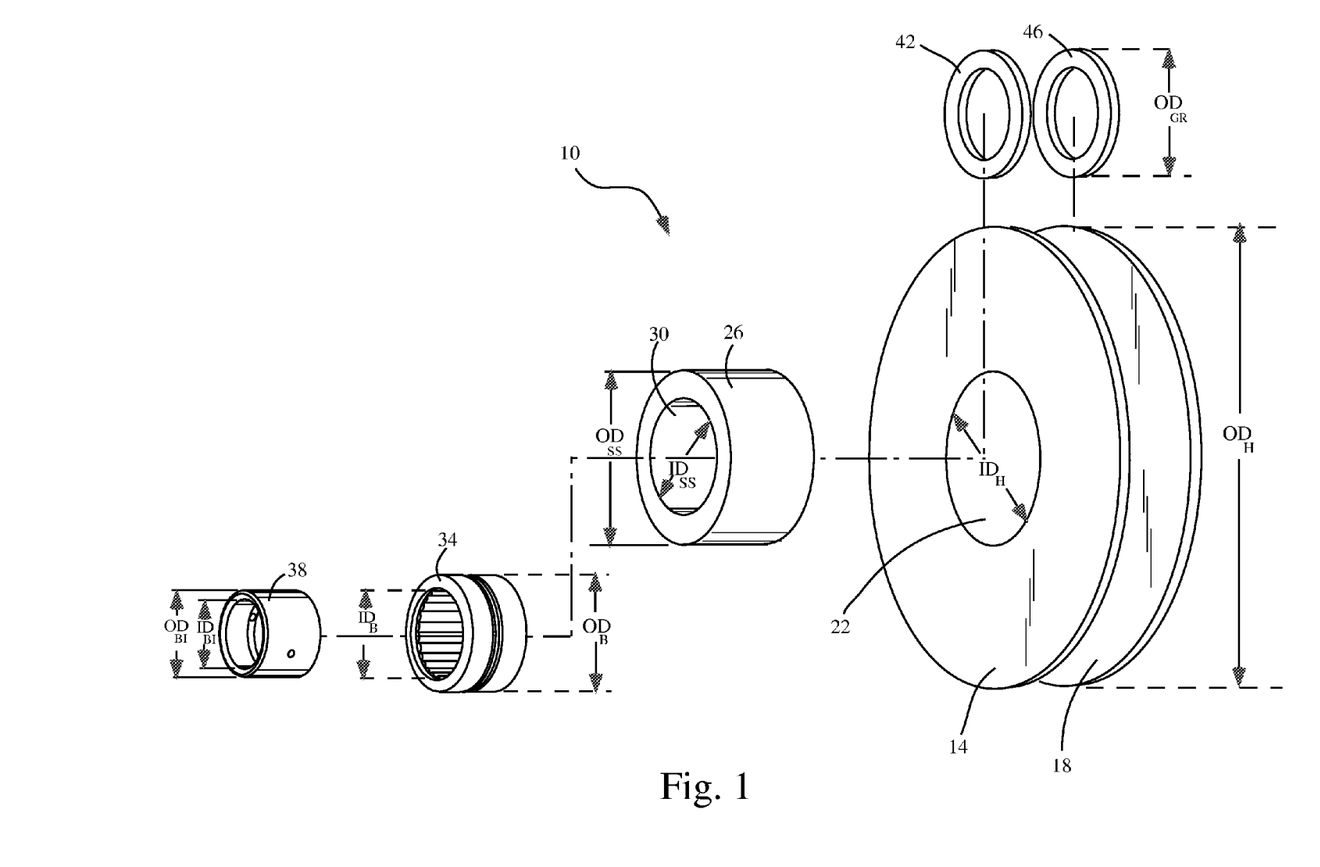
FIG. 1 is a perspective exploded view of one embodiment of the disclosed sheave.

FIG. 1 is an exploded perspective view of one embodiment of the disclosed sheave 10. The sheave comprises a grooved sheave body 14. The sheave body 14 comprises a groove 18, and a sheave bore 22 with an inner diameter $ID_H$. The sheave body has an outer diameter $OD_H$. A sheave sleeve 26 has an outer diameter $OD_{SS}$ and a sleeve bore 30 with an inner diameter $ID_{SS}$. The sheave sleeve 26 is configured to fit in the sheave body bore 22. $OD_{SS}$ may be sized with the respect to the $ID_H$ such that the sheave sleeve 26 may be press fit into the sheave body 14. In other embodiments, the sheave sleeve 26 may have an interference fit with the sheave bore 22, or the sheave sleeve 26 may be otherwise attached to the sheave bore 22, such as but not limited to a tack weld. In this embodiment of the disclosed sheave 10, the sheave sleeve 26 is configured to allow a bearing 34, such as but not limited to a roller bearing, to be press fit into the sleeve bore 30. The bearing has an outer diameter $OD_B$. In one embodiment the bearing 34 may be fitted directly onto a shaft. The bearing has an inner diameter $ID_B$. In other embodiment, a bearing insert 38 may be rotatedly attached to the bearing's $ID_B$, and be non-rotatably attached to a shaft via the bearing insert's inner diameter $ID_{BI}$. The bearing insert 38 will also have an outer diameter $OD_{BI}$. The bearing insert 38 may also be known as a bearing race. In other embodiments, optional grease retainers 42, 46, each with an outer diameter of $OD_{GR}$ will fit within the sheave sleeve bore 30, and are configured to retain lubricant within the sleeve bore 30, thus providing for lubrication to the bearing 34.

Figure 2:
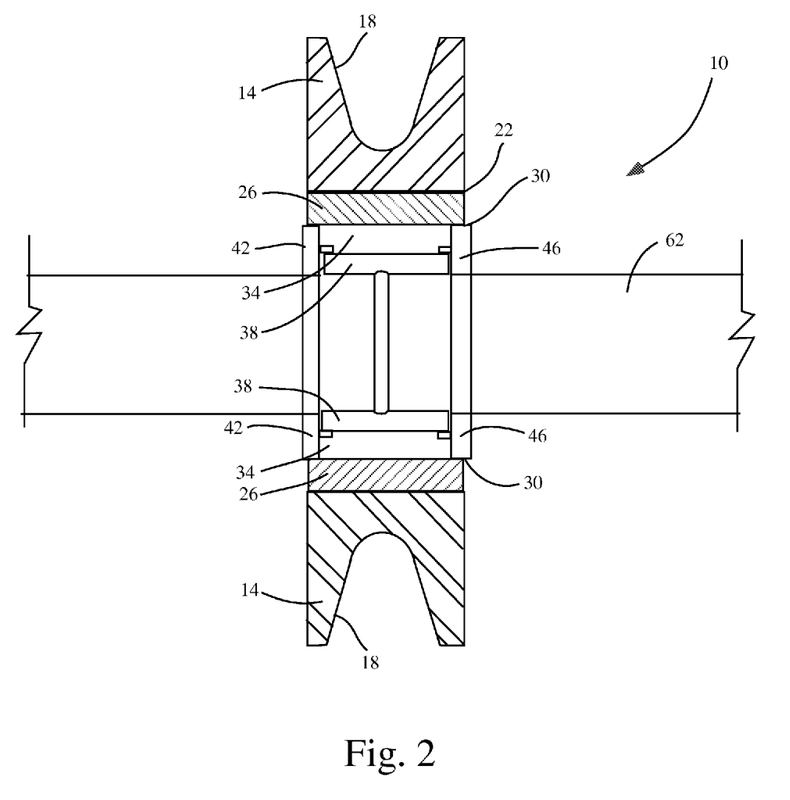
FIG. 2 is a cross-sectional view of the sheave from FIG. 1.

FIG. 2 shows a cross-sectional view of the sheave 10 above, assembled and with the sheave in rotatable communication with a shaft 62.

Figure 3:
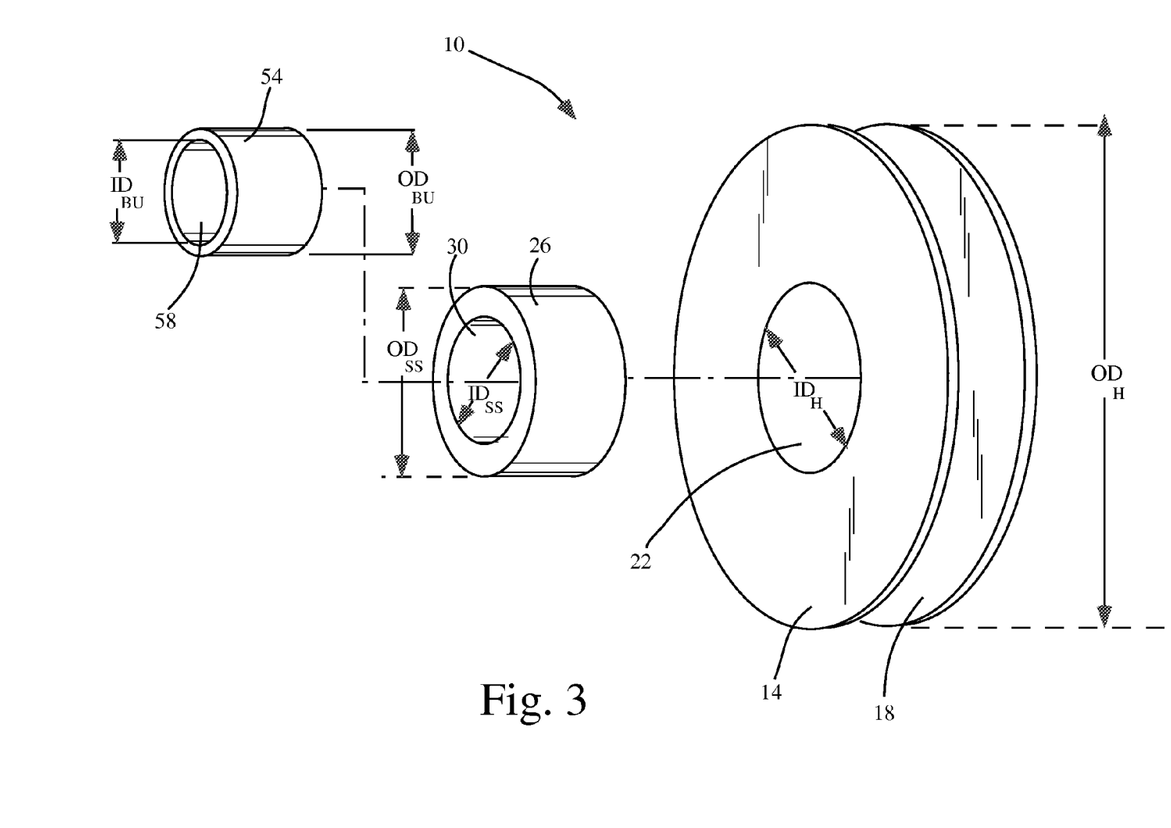
FIG. 3 is a perspective exploded view of another embodiment of the disclosed sheave.

FIG. 3 shows an exploded perspective view of another embodiment of the disclosed sheave 50. The sheave 50 comprises a grooved sheave body 14. The sheave body 14 comprises a groove 18, and a sheave bore 22 with an inner diameter $ID_H$, the sheave body has an outer diameter $OD_H$. A sheave sleeve 26 has an outer diameter $OD_{SS}$ and a sleeve bore 30 with an inner diameter $ID_{SS}$. The sheave sleeve 26 is configured to fit in the sheave bore 22. $OD_{SS}$ may be sized with the respect to the $ID_H$ such that the sheave sleeve 26 may be press fit into the sheave body 14. In other embodiments, the sheave sleeve 26 may have an interference fit with the sheave bore 22, or the sheave sleeve 26 may be otherwise attached to the sheave bore 22, such as but not limited to a tack weld. In this embodiment of the disclosed sheave 10, the sheave sleeve 26 is configured to allow a bushing 54, such as but not limited to a bronze bushing, to be press fit into the sleeve bore 30. The bushing 54 has an outer diameter $OD_{BU}$ and an inner diameter $ID_{BU}$. The bushing 54 has a bore 58 configured to allow a shaft to be in rotatable communication with the bushing 54, and located within the bushing 54. In one embodiment the bushing 54 may be fitted directly onto a shaft, via the $ID_{BU}$.

Figure 4:
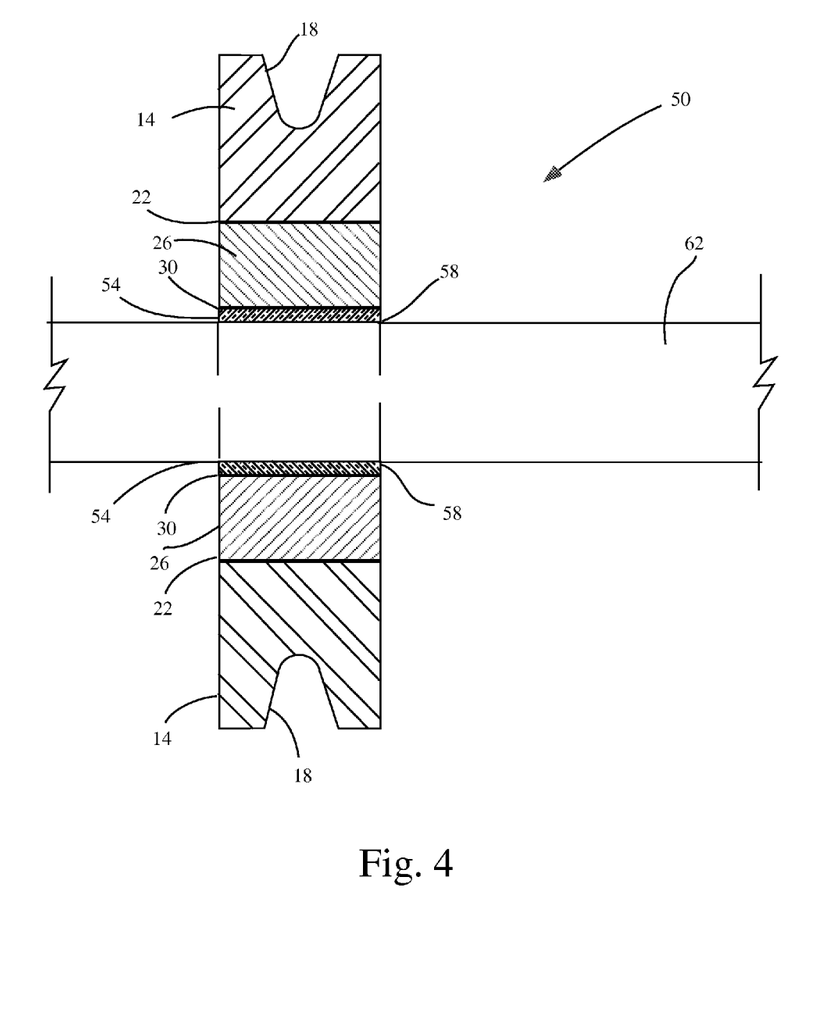
FIG. 4 is a cross-sectional view of the sheave from FIG. 3.

FIG. 4 shows a cross-sectional view of the sheave 50 above, assembled and with the sheave 50 in rotatable communication with a shaft 62.

TABLE 1

| Rope Size | Shaft Size | Hub Width | Bronze Bushing | | | | Roller Bearing | | | | Roller Bearing w/ Inner Race | | | |
|---|---|---|---|---|---|---|---|---|---|---|---|---|---|---|
| | | | 6" OD | 8" OD | 10" OD | 12" OD | 6" OD | 8" OD | 10" OD | 12" OD | 6" OD | 8" OD | 10" OD | 12" OD |
| 3/8 | 1.000 | 1.250 | X | X | X | X | | | | | | | | |
| | 1.000 | 1.500 | X | X | X | X | | | | | | | | |
| | 1.000 | 1.625 | X | X | X | X | | | | | | | | |
| | 1.000 | 1.750 | X | X | X | X | | | | | | | | |
| | 1.000 | 2.000 | X | X | X | X | | | | | | | | |
| | 1.000 | 2.250 | X | X | X | X | | | | | | | | |
| | 1.250 | 1.250 | X | X | X | X | | | | | X | X | X | X |
| | 1.250 | 1.500 | X | X | X | X | | | | | X | X | X | X |
| | 1.250 | 1.563 | | | | | | | | | X | X | X | X |
| | 1.250 | 1.625 | X | X | X | X | | | | | X | X | X | X |
| | 1.250 | 1.750 | X | X | X | X | | | | | | | | |
| | 1.250 | 2.000 | X | X | X | X | | | | | | | | |
| | 1.250 | 2.250 | X | X | X | X | | | | | | | | |
| | 1.375 | 1.250 | | | | | | | | | X | X | X | X |
| | 1.375 | 1.500 | | | | | | | | | X | X | X | X |
| | 1.375 | 1.563 | | | | | | | | | X | X | X | X |
| | 1.375 | 1.625 | | | | | | | | | X | X | X | X |
| | 1.375 | 1.750 | | | | | | | | | | | | |
| | 1.500 | 1.250 | X | X | X | X | X | X | X | X | X | X | X | X |
| | 1.500 | 1.500 | X | X | X | X | X | X | X | X | X | X | X | X |
| | 1.500 | 1.625 | X | X | X | X | X | X | X | X | X | X | X | X |
| | 1.500 | 1.750 | X | X | X | X | X | X | X | X | | | | |
| | 1.500 | 2.000 | X | X | X | X | | | | | | | | |
| | 1.500 | 2.250 | X | X | X | X | | | | | | | | |
| | 1.625 | 1.250 | X | X | X | X | X | X | X | X | X | X | X | X |
| | 1.625 | 1.500 | X | X | X | X | X | X | X | X | X | X | X | X |
| | 1.625 | 1.625 | X | X | X | X | X | X | X | X | X | X | X | X |
| | 1.625 | 1.750 | X | X | X | X | X | X | X | X | | | | |
| | 1.625 | 2.000 | X | X | X | X | | | | | | | | |
| | 1.625 | 2.250 | X | X | X | X | | | | | | | | |
| | 1.750 | 1.250 | X | X | X | X | X | X | X | X | | | | |
| | 1.750 | 1.500 | X | X | X | X | X | X | X | X | | | | |

TABLE 1-continued

| Rope Size | Shaft Size | Hub Width | Bronze Bushing | | | | Roller Bearing | | | | Roller Bearing w/ Inner Race | | | |
|---|---|---|---|---|---|---|---|---|---|---|---|---|---|---|
| | | | 6" OD | 8" OD | 10" OD | 12" OD | 6" OD | 8" OD | 10" OD | 12" OD | 6" OD | 8" OD | 10" OD | 12" OD |
| | 1.750 | 1.625 | X | X | X | X | X | X | X | X | | | | |
| | 1.750 | 1.750 | X | X | X | X | X | X | X | X | | | | |
| | 1.750 | 2.000 | X | X | X | X | | | | | | | | |
| | 1.750 | 2.250 | X | X | X | X | | | | | | | | |
| | 2.000 | 1.250 | X | X | X | X | X | X | X | X | | | | |
| | 2.000 | 1.500 | X | X | X | X | X | X | X | X | | | | |
| | 2.000 | 1.625 | X | X | X | X | X | X | X | X | | | | |
| | 2.000 | 1.750 | X | X | X | X | X | X | X | X | | | | |
| | 2.000 | 2.000 | X | X | X | X | | | | | | | | |
| | 2.000 | 2.250 | X | X | X | X | | | | | | | | |
| | 2.250 | 1.250 | X | X | X | X | | | | | | | | |
| | 2.250 | 1.500 | X | X | X | X | | | | | | | | |
| | 2.250 | 1.625 | X | X | X | X | | | | | | | | |
| | 2.250 | 1.750 | X | X | X | X | | | | | | | | |
| | 2.250 | 2.000 | X | X | X | X | | | | | | | | |
| | 2.250 | 2.250 | X | X | X | X | | | | | | | | |
| 7/16 | 1.000 | 1.250 | X | X | X | X | | | | | | | | |
| | 1.000 | 1.500 | X | X | X | X | | | | | | | | |
| | 1.000 | 1.625 | X | X | X | X | | | | | | | | |
| | 1.000 | 1.750 | X | X | X | X | | | | | | | | |
| | 1.000 | 2.000 | X | X | X | X | | | | | | | | |
| | 1.000 | 2.250 | X | X | X | X | | | | | | | | |
| | 1.250 | 1.250 | X | X | X | X | | | | | X | X | X | X |
| | 1.250 | 1.500 | X | X | X | X | | | | | X | X | X | X |
| | 1.250 | 1.563 | | | | | | | | | X | X | X | X |
| | 1.250 | 1.625 | X | X | X | X | | | | | X | X | X | X |
| | 1.250 | 1.750 | X | X | X | X | | | | | | | | |
| | 1.250 | 2.000 | X | X | X | X | | | | | | | | |
| | 1.250 | 2.250 | X | X | X | X | | | | | | | | |
| | 1.375 | 1.625 | | | | | | | | | X | X | X | X |
| | 1.500 | 1.250 | X | X | X | X | X | X | X | X | X | X | X | X |
| | 1.500 | 1.500 | X | X | X | X | X | X | X | X | X | X | X | X |
| | 1.500 | 1.625 | X | X | X | X | X | X | X | X | X | X | X | X |
| | 1.500 | 1.750 | X | X | X | X | X | X | X | X | | | | |
| | 1.500 | 2.000 | X | X | X | X | | | | | | | | |
| | 1.500 | 2.250 | X | X | X | X | | | | | | | | |
| | 1.625 | 1.250 | X | X | X | X | X | X | X | X | X | X | X | X |
| | 1.625 | 1.500 | X | X | X | X | X | X | X | X | X | X | X | X |
| | 1.625 | 1.625 | X | X | X | X | X | X | X | X | X | X | X | X |
| | 1.625 | 1.750 | X | X | X | X | X | X | X | X | | | | |
| | 1.625 | 2.000 | X | X | X | X | | | | | | | | |
| | 1.625 | 2.250 | X | X | X | X | | | | | | | | |
| | 1.750 | 1.250 | X | X | X | X | X | X | X | X | | | | |
| | 1.750 | 1.500 | X | X | X | X | X | X | X | X | | | | |
| | 1.750 | 1.625 | X | X | X | X | X | X | X | X | | | | |
| | 1.750 | 1.750 | X | X | X | X | X | X | X | X | | | | |
| | 1.750 | 2.000 | X | X | X | X | | | | | | | | |
| | 1.750 | 2.250 | X | X | X | X | | | | | | | | |
| | 2.000 | 1.250 | X | X | X | X | X | X | X | X | | | | |
| | 2.000 | 1.500 | X | X | X | X | X | X | X | X | | | | |
| | 2.000 | 1.625 | X | X | X | X | X | X | X | X | | | | |
| | 2.000 | 1.750 | X | X | X | X | X | X | X | X | | | | |
| | 2.000 | 2.000 | X | X | X | X | | | | | | | | |
| | 2.000 | 2.250 | X | X | X | X | | | | | | | | |
| | 2.250 | 1.250 | X | X | X | X | | | | | | | | |
| | 2.250 | 1.500 | X | X | X | X | | | | | | | | |
| | 2.250 | 1.625 | X | X | X | X | | | | | | | | |
| | 2.250 | 1.750 | X | X | X | X | | | | | | | | |
| | 2.250 | 2.000 | X | X | X | X | | | | | | | | |
| | 2.250 | 2.250 | X | X | X | X | | | | | | | | |
| 1/2 | 1.000 | 1.250 | X | X | X | X | | | | | | | | |
| | 1.000 | 1.500 | X | X | X | X | | | | | | | | |
| | 1.000 | 1.625 | X | X | X | X | | | | | | | | |
| | 1.000 | 1.750 | X | X | X | X | | | | | | | | |
| | 1.000 | 2.000 | X | X | X | X | | | | | | | | |
| | 1.000 | 2.250 | X | X | X | X | | | | | | | | |
| | 1.250 | 1.250 | X | X | X | X | | | | | X | X | X | X |
| | 1.250 | 1.500 | X | X | X | X | | | | | X | X | X | X |
| | 1.250 | 1.563 | | | | | | | | | X | X | X | X |
| | 1.250 | 1.625 | X | X | X | X | | | | | X | X | X | X |
| | 1.250 | 1.750 | X | X | X | X | | | | | | | | |
| | 1.250 | 2.000 | X | X | X | X | | | | | | | | |
| | 1.250 | 2.250 | X | X | X | X | | | | | | | | |
| | 1.375 | 1.250 | | | | | | | | | X | X | X | X |

TABLE 1-continued

| Rope Size | Shaft Size | Hub Width | Bronze Bushing | | | | Roller Bearing | | | | Roller Bearing w/ Inner Race | | | |
|---|---|---|---|---|---|---|---|---|---|---|---|---|---|---|
| | | | 6" OD | 8" OD | 10" OD | 12" OD | 6" OD | 8" OD | 10" OD | 12" OD | 6" OD | 8" OD | 10" OD | 12" OD |
| | 1.375 | 1.500 | | | | | | | | | X | X | X | X |
| | 1.375 | 1.563 | | | | | | | | | X | X | X | X |
| | 1.375 | 1.625 | | | | | | | | | X | X | X | X |
| | 1.500 | 1.250 | X | X | X | X | X | X | X | X | X | X | X | X |
| | 1.500 | 1.500 | X | X | X | X | X | X | X | X | X | X | X | X |
| | 1.500 | 1.625 | X | X | X | X | X | X | X | X | X | X | X | X |
| | 1.500 | 1.750 | X | X | X | X | X | X | X | X | | | | |
| | 1.500 | 2.000 | X | X | X | X | | | | | | | | |
| | 1.500 | 2.250 | X | X | X | X | | | | | | | | |
| | 1.625 | 1.250 | X | X | X | X | X | X | X | X | X | X | X | X |
| | 1.625 | 1.500 | X | X | X | X | X | X | X | X | X | X | X | X |
| | 1.625 | 1.625 | X | X | X | X | X | X | X | X | X | X | X | X |
| | 1.625 | 1.750 | X | X | X | X | X | X | X | X | | | | |
| | 1.625 | 2.000 | X | X | X | X | | | | | | | | |
| | 1.625 | 2.250 | X | X | X | X | | | | | | | | |
| | 1.750 | 1.250 | X | X | X | X | X | X | X | X | | | | |
| | 1.750 | 1.500 | X | X | X | X | X | X | X | X | | | | |
| | 1.750 | 1.625 | X | X | X | X | X | X | X | X | | | | |
| | 1.750 | 1.750 | X | X | X | X | X | X | X | X | | | | |
| | 1.750 | 2.000 | X | X | X | X | | | | | | | | |
| | 1.750 | 2.250 | X | X | X | X | | | | | | | | |
| | 2.000 | 1.250 | X | X | X | X | X | X | X | X | | | | |
| | 2.000 | 1.500 | X | X | X | X | X | X | X | X | | | | |
| | 2.000 | 1.625 | X | X | X | X | X | X | X | X | | | | |
| | 2.000 | 1.750 | X | X | X | X | X | X | X | X | | | | |
| | 2.000 | 2.000 | X | X | X | X | | | | | | | | |
| | 2.000 | 2.250 | X | X | X | X | | | | | | | | |
| | 2.250 | 1.250 | X | X | X | X | | | | | | | | |
| | 2.250 | 1.500 | X | X | X | X | | | | | | | | |
| | 2.250 | 1.625 | X | X | X | X | | | | | | | | |
| | 2.250 | 1.750 | X | X | X | X | | | | | | | | |
| | 2.250 | 2.000 | X | X | X | X | | | | | | | | |
| | 2.250 | 2.250 | X | X | X | X | | | | | | | | |
| 9/16 | 1.000 | 1.250 | X | X | X | X | | | | | | | | |
| | 1.000 | 1.500 | X | X | X | X | | | | | | | | |
| | 1.000 | 1.625 | X | X | X | X | | | | | | | | |
| | 1.000 | 1.750 | X | X | X | X | | | | | | | | |
| | 1.000 | 2.000 | X | X | X | X | | | | | | | | |
| | 1.000 | 2.250 | X | X | X | X | | | | | | | | |
| | 1.250 | 1.250 | X | X | X | X | | | | | X | X | X | X |
| | 1.250 | 1.500 | X | X | X | X | | | | | X | X | X | X |
| | 1.250 | 1.563 | | | | | | | | | X | X | X | X |
| | 1.250 | 1.625 | X | X | X | X | | | | | X | X | X | X |
| | 1.250 | 1.750 | X | X | X | X | | | | | | | | |
| | 1.250 | 2.000 | X | X | X | X | | | | | | | | |
| | 1.250 | 2.250 | X | X | X | X | | | | | | | | |
| | 1.375 | 1.250 | | | | | | | | | X | X | X | X |
| | 1.375 | 1.500 | | | | | | | | | X | X | X | X |
| | 1.375 | 1.625 | | | | | | | | | X | X | X | X |
| | 1.500 | 1.250 | X | X | X | X | X | X | X | X | X | X | X | X |
| | 1.500 | 1.500 | X | X | X | X | X | X | X | X | X | X | X | X |
| | 1.500 | 1.625 | X | X | X | X | X | X | X | X | X | X | X | X |
| | 1.500 | 1.750 | X | X | X | X | X | X | X | X | | | | |
| | 1.500 | 2.000 | X | X | X | X | | | | | | | | |
| | 1.500 | 2.250 | X | X | X | X | | | | | | | | |
| | 1.625 | 1.250 | X | X | X | X | X | X | X | X | X | X | X | X |
| | 1.625 | 1.500 | X | X | X | X | X | X | X | X | X | X | X | X |
| | 1.625 | 1.625 | X | X | X | X | X | X | X | X | X | X | X | X |
| | 1.625 | 1.750 | X | X | X | X | X | X | X | X | | | | |
| | 1.625 | 2.000 | X | X | X | X | | | | | | | | |
| | 1.625 | 2.250 | X | X | X | X | | | | | | | | |
| | 1.750 | 1.250 | X | X | X | X | X | X | X | X | | | | |
| | 1.750 | 1.500 | X | X | X | X | X | X | X | X | | | | |
| | 1.750 | 1.625 | X | X | X | X | X | X | X | X | | | | |
| | 1.750 | 1.750 | X | X | X | X | X | X | X | X | | | | |
| | 1.750 | 2.000 | X | X | X | X | | | | | | | | |
| | 1.750 | 2.250 | X | X | X | X | | | | | | | | |
| | 2.000 | 1.250 | X | X | X | X | X | X | X | X | | | | |
| | 2.000 | 1.500 | X | X | X | X | X | X | X | X | | | | |
| | 2.000 | 1.625 | X | X | X | X | X | X | X | X | | | | |
| | 2.000 | 1.750 | X | X | X | X | X | X | X | X | | | | |
| | 2.000 | 2.000 | X | X | X | X | | | | | | | | |
| | 2.000 | 2.250 | X | X | X | X | | | | | | | | |
| | 2.250 | 1.250 | X | X | X | X | | | | | | | | |

TABLE 1-continued

| Rope Size | Shaft Size | Hub Width | Bronze Bushing | | | | Roller Bearing | | | | Roller Bearing w/ Inner Race | | | |
|---|---|---|---|---|---|---|---|---|---|---|---|---|---|---|
| | | | 6" OD | 8" OD | 10" OD | 12" OD | 6" OD | 8" OD | 10" OD | 12" OD | 6" OD | 8" OD | 10" OD | 12" OD |
| | 2.250 | 1.500 | X | X | X | X | | | | | | | | |
| | 2.250 | 1.625 | X | X | X | X | | | | | | | | |
| | 2.250 | 1.750 | X | X | X | X | | | | | | | | |
| | 2.250 | 2.000 | X | X | X | X | | | | | | | | |
| | 2.250 | 2.250 | X | X | X | X | | | | | | | | |
| 5/8 | 1.000 | 1.250 | X | X | X | X | | | | | | | | |
| | 1.000 | 1.500 | X | X | X | X | | | | | | | | |
| | 1.000 | 1.625 | X | X | X | X | | | | | | | | |
| | 1.000 | 1.750 | X | X | X | X | | | | | | | | |
| | 1.000 | 2.000 | X | X | X | X | | | | | | | | |
| | 1.000 | 2.250 | X | X | X | X | | | | | | | | |
| | 1.250 | 1.250 | X | X | X | X | | | | | X | X | X | X |
| | 1.250 | 1.500 | X | X | X | X | | | | | X | X | X | X |
| | 1.250 | 1.563 | | | | | | | | | X | X | X | X |
| | 1.250 | 1.625 | X | X | X | X | | | | | X | X | X | X |
| | 1.250 | 1.750 | X | X | X | X | | | | | | | | |
| | 1.250 | 2.000 | X | X | X | X | | | | | | | | |
| | 1.250 | 2.250 | X | X | X | X | | | | | | | | |
| | 1.375 | 1.250 | | | | | | | | | X | X | X | X |
| | 1.375 | 1.500 | | | | | | | | | X | X | X | X |
| | 1.375 | 1.625 | | | | | | | | | X | X | X | X |
| | 1.500 | 1.250 | X | X | X | X | X | X | X | X | X | X | X | X |
| | 1.500 | 1.500 | X | X | X | X | X | X | X | X | X | X | X | X |
| | 1.500 | 1.625 | X | X | X | X | X | X | X | X | X | X | X | X |
| | 1.500 | 1.750 | X | X | X | X | X | X | X | X | | | | |
| | 1.500 | 2.000 | X | X | X | X | | | | | | | | |
| | 1.500 | 2.250 | X | X | X | X | | | | | | | | |
| | 1.625 | 1.250 | X | X | X | X | X | X | X | X | X | X | X | X |
| | 1.625 | 1.500 | X | X | X | X | X | X | X | X | X | X | X | X |
| | 1.625 | 1.625 | X | X | X | X | X | X | X | X | X | X | X | X |
| | 1.625 | 1.750 | X | X | X | X | X | X | X | X | | | | |
| | 1.625 | 2.000 | X | X | X | X | | | | | | | | |
| | 1.625 | 2.250 | X | X | X | X | | | | | | | | |
| | 1.750 | 1.250 | X | X | X | X | X | X | X | X | | | | |
| | 1.750 | 1.500 | X | X | X | X | X | X | X | X | | | | |
| | 1.750 | 1.625 | X | X | X | X | X | X | X | X | | | | |
| | 1.750 | 1.750 | X | X | X | X | X | X | X | X | | | | |
| | 1.750 | 2.000 | X | X | X | X | | | | | | | | |
| | 1.750 | 2.250 | X | X | X | X | | | | | | | | |
| | 2.000 | 1.250 | X | X | X | X | X | X | X | X | | | | |
| | 2.000 | 1.500 | X | X | X | X | X | X | X | X | | | | |
| | 2.000 | 1.625 | X | X | X | X | X | X | X | X | | | | |
| | 2.000 | 1.750 | X | X | X | X | X | X | X | X | | | | |
| | 2.000 | 2.000 | X | X | X | X | | | | | | | | |
| | 2.000 | 2.250 | X | X | X | X | | | | | | | | |
| | 2.250 | 1.250 | X | X | X | X | | | | | | | | |
| | 2.250 | 1.500 | X | X | X | X | | | | | | | | |
| | 2.250 | 1.625 | X | X | X | X | | | | | | | | |
| | 2.250 | 1.750 | X | X | X | X | | | | | | | | |
| | 2.250 | 2.000 | X | X | X | X | | | | | | | | |
| | 2.250 | 2.250 | X | X | X | X | | | | | | | | |
| 1420 | | | 210 | 210 | 210 | 210 | 80 | 80 | 80 | 80 | 65 | 65 | 65 | 65 |

5 Rope Sizes
20 Sheave Bodies
46 Adapters
72 Bearing Cartridges
1420 Configurations In one example of use of the disclosed invention, various sized grooved sheave bodies will be available (the various sized grooved sheave bodies may have different outer diameters, and groove sizes, as well as other differing specifications), however, each of the different sized grooved sheave bodies will have the same $ID_H$. Thus, one may have a plurality of 12 inch sheaves (12 inch $OD_H$), and a plurality of 6 inch sheaves (6 inch $OD_H$). However, both the 12 inch sheaves and the 6 inch sheaves will have the same $ID_H$. Thus, in order to fit the sheaves onto different sized shafts, one simply uses a sheave sleeve with an $OD_{SS}$ that is configured to fit in the $ID_H$ of either the 12 inch sheave or the 6 inch sheave, with the sheave sleeve being sized to have an $ID_{SS}$ to accommodate the bearing, or bushing that will fit over the shaft. Table 1, above, shows the variety of sheaves that a sheave manufacture may be required to produce for a customer. The first column is the diameter of various rope sizes that may be required to fit in the groove of the sheave. The second column is the outer diameter of the shaft that may attached to a bushing, such as but not limited to a bronze bushing, or to a bearing, such as but not limited to a roller bearing. Thus, for a ⅜ inch rope, the shaft sizes that should be available to a customer range from about 1.000 inch to about 2.250 inches. The third through sixth columns indicate that sheaves with ODs ranging from 6" to 12" are available with bronze bushings to accept all indicated shaft sizes (1.000 to 2.250) for a rope size of ⅜ inch. The seventh through tenth columns indicate that sheaves with ODs ranging from 6" to 12" are available to fit roller bearings that can accept shaft sizes of 1.5 to 2 inches (as shown by the Xs). The table shows four sheave sizes (6" OD, 8" OD, 10" OD, and 12" OD), five common rope sizes; seven popular shaft sizes with bronze bushings; four popular shaft sizes with roller bearings and four popular shaft sizes with roller bearing inner races. These sizes lead to 1420 configurations of sheaves that may be specified by a customer. Thus, without the invention full stocking for quick delivery requires a supply of 1420 sheave configurations. However, with the invention, full stocking for quick delivery requires: 20 common bore sheaves (5 rope sizes×4 sheave ODs); 56 adapters; 42 bronze bushings; 4 roller bearings, 4 roller bearing inner races, a total of 126 components to be able to make any of the 1420 sheave configurations. The sheave bodies are a major expense because the other items are low cost and generally the bronze bushings, roller bearings and roller bearing inner races are readily available stock items.

Thus, the inventory cost for using the disclosed invention is much lower than if one had to assemble sheaves according to customer specification without the disclosed invention. For example, if a manufacturer were to provide for sheave sizes of 6, 8, 10 and 12 inches ($OD_H$), and the capacity to handle rope sizes of ⅜, ⁷⁄₁₆, ½, and ⅝ inch (the rope will communicate with the sheave via the groove 18), and 56 different bore sizes (the bore sizes corresponding to the size of the bore required to accept the shaft, in one example this would be the inner diameter of the bushing 54, or in another example, this would be the inner diameter of the roller bearing insert 38, this would lead to 1420 combinations of unique sheaves. In order to make 10 units of any particular sized sheave, using the disclosed invention, the inventory costs to stock the sheaves, sleeves, and bearings would be less than $25,000. However, without the invention, the inventory costs to be able to make 10 units of any particular sized sheaves out of the 1420 different possible combinations would be over $1,500,000, due to the number of parts required to have on hand to be able to produce the variety of sheaves that may be required by users. Without using the disclosed invention, one must have in stock a different sized sheave, each sheave having a specific groove size, specific outer diameter, and a specific inner diameter to fit a specific bearing size and/or bushing size.

Figure 5:
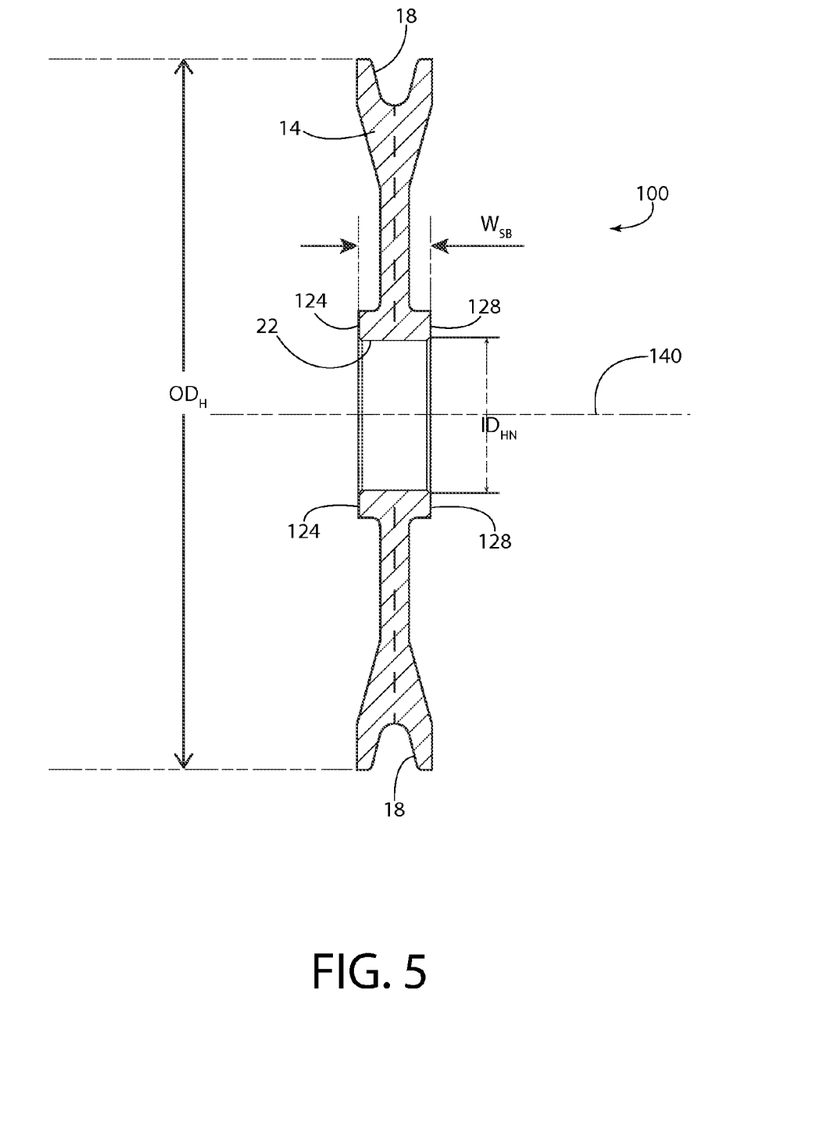
FIG. 5 is a cross-sectional view of another embodiment of the sheave.

FIG. 5 shows another embodiment of the sheave 100. The sheave comprises a grooved sheave body 14. The sheave body 14 comprises a groove 18, and a sheave bore 22 with an inner diameter $ID_{HN}$. The sheave bore 22 may have a sheave bore axis 140. The sheave body has an outer diameter $OD_H$. The sheave bore 22 has a width $W_{SB}$. The sheave body 14 comprises a first circumferential surface 124 that generally encircles the sheave bore 22 on one side of the sheave body 14. The sheave body 14 also comprises a second circumferential surface 128 that generally encircles the sheave bore 22 on an opposite side of the sheave body 14. The first and second circumferential surfaces 124, 128 are generally orthogonal to the sheave bore axis 140.

Figure 6:
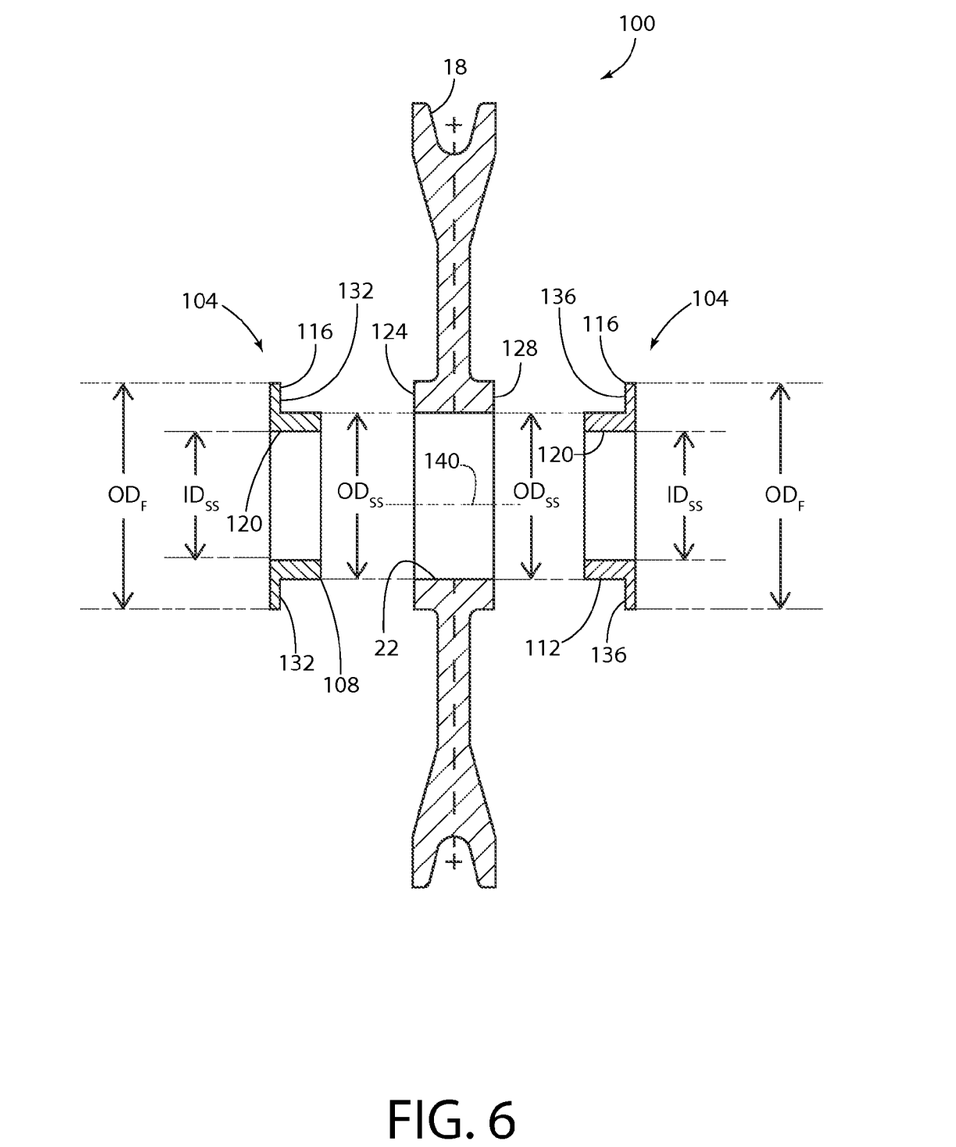
FIG. 6 is a cross-sectional view of the sheave from FIG. 5 and the two piece flanged adapter.

FIG. 6 shows the sheave 100 from FIG. 5, with a two piece flanged adapter 104 comprising a first piece 108, and a second piece 112 located on either side of the sheave 100 before being installed into the sheave 100. The first piece 108 comprises a flange 116, an adapter bore 120, and a first inner flange surface 132. The adapter bore 120 has an inner diameter $ID_{SS}$. The first inner flange surface 132 generally encircles the adapter bore 120. The second piece 112 is generally a mirror image of the first piece 108. The second piece also has flange 116, an adapter bore 120, and second inner flange surface 136. The adapter bore 120 has an inner diameter $ID_{SS}$. The second inner flange surface 136 generally encircles the adapter bore 120. First and second pieces 108, 112 also have an outer diameter $OD_{SS}$. Please note that the $OD_{SS}$ is smaller than the outer flange diameter $OD_F$. In one embodiment, the inner diameter $ID_{SS}$ of both pieces 104, 108 are equal.

Figure 7:
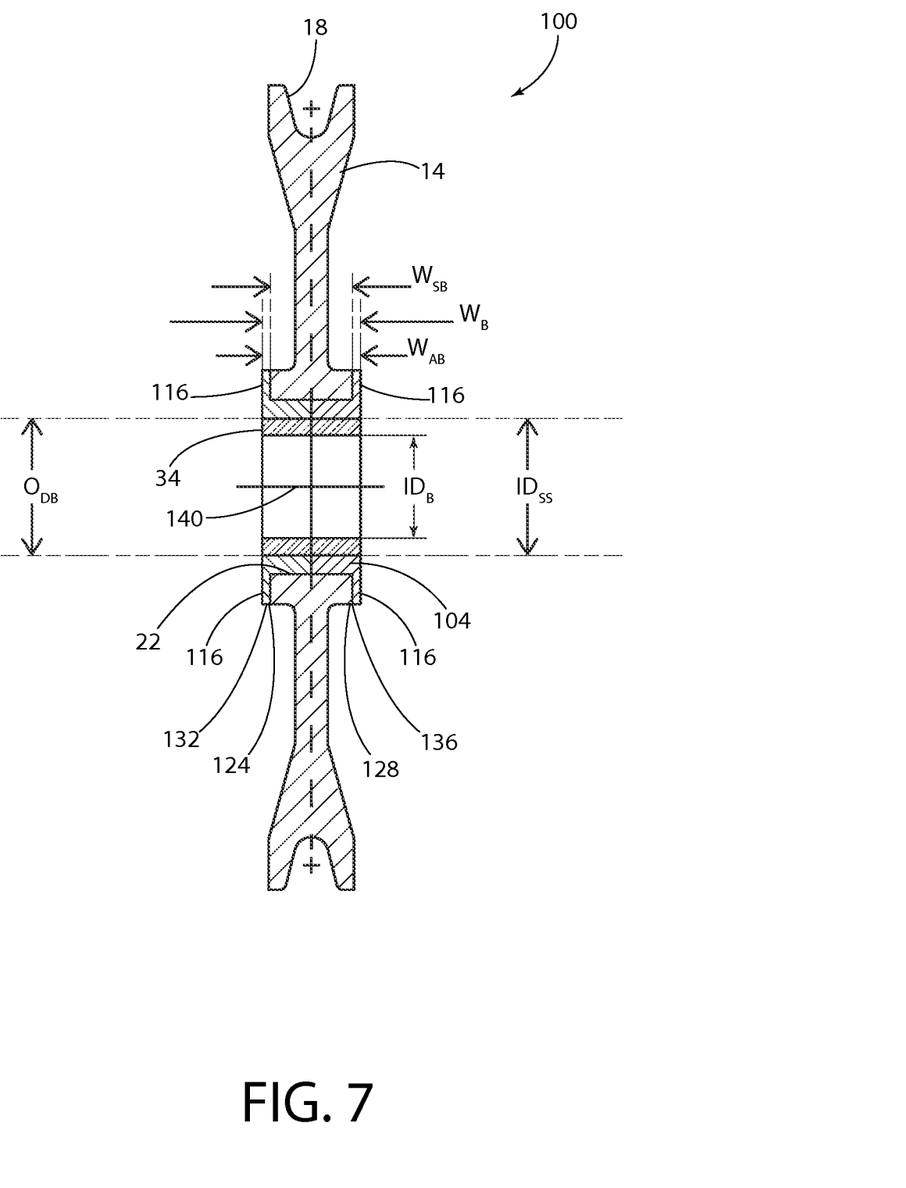
FIG. 7 is a cross-sectional view of the sheave from FIG. 5 with the two piece flanged adapter and a bearing installed in the sheave.

FIG. 7 shows the two piece flanged adapter 104 installed in the sheave 100. A bearing 34 is installed in the two piece flanged adapter 104. The bearing 34 has an inner diameter of $ID_B$ and an outer diameter of $OD_B$. Note how the adapter bore 120 has a width $W_{AB}$ that is larger than the width of the sheave bore 22, shown by $W_{SB}$. Note how the flanges 116 abut to the body of the sheave body. Thus, using the same sheave 100, one can accommodate bearings of various outer diameters $O_{DB}$, and bearings of different widths $W_B$ by using differently sized flanged adapters 104. The various flanged adapters 104 may have various sized adapter bore 120 inner diameters $ID_{SS}$, and different adapter bore widths $W_{AB}$. This is important because the load capacity of sleeve bearings may be directly correlated to the bearing width $W_B$. The pieces 108, 112 of the two piece flanged adapter 104 may be attached to the sheave body in any suitable way, including and not limited to an interference fit with the sheave bore 22, an interference fit with the sheave bore 22 with the use of an adhesive, such as Loctite. They may be attached with a tack weld; mechanical fasteners such as bolts through the flanges and into the sheave body; drive pins; etc.

The material used for the sheave body may be any suitable material including but not limited to: metal, ductile iron, steel, nylon, aluminum, cast polyamide. The two piece flanged adapters 104 may also be made out of any suitable material, including but not limited to: steel, sintered metal, aluminum, and non-metallic materials.

Generally, the two pieces 108, 112 abut each other when installed in the sheave bore 22. However, in other embodiments, there may be a gap between the two pieces 108, 112 when installed in a sheave bore 22. Such a gap may be useful for lubricating the bearing. The gap may serve as a passage for grease or other lubricant to the bearing.

Referring back to FIG. 7, please note how the first inner flange surface 132 abuts to the first circumferential surface 124. Similarly the second inner flange surface 136 abuts to the second circumferential surface 128. The first inner flange surface 132 and second inner flange surface 136 are generally perpendicular to the sheave bore axis 140 when installed in the sheave bore 22.

Figure 8:
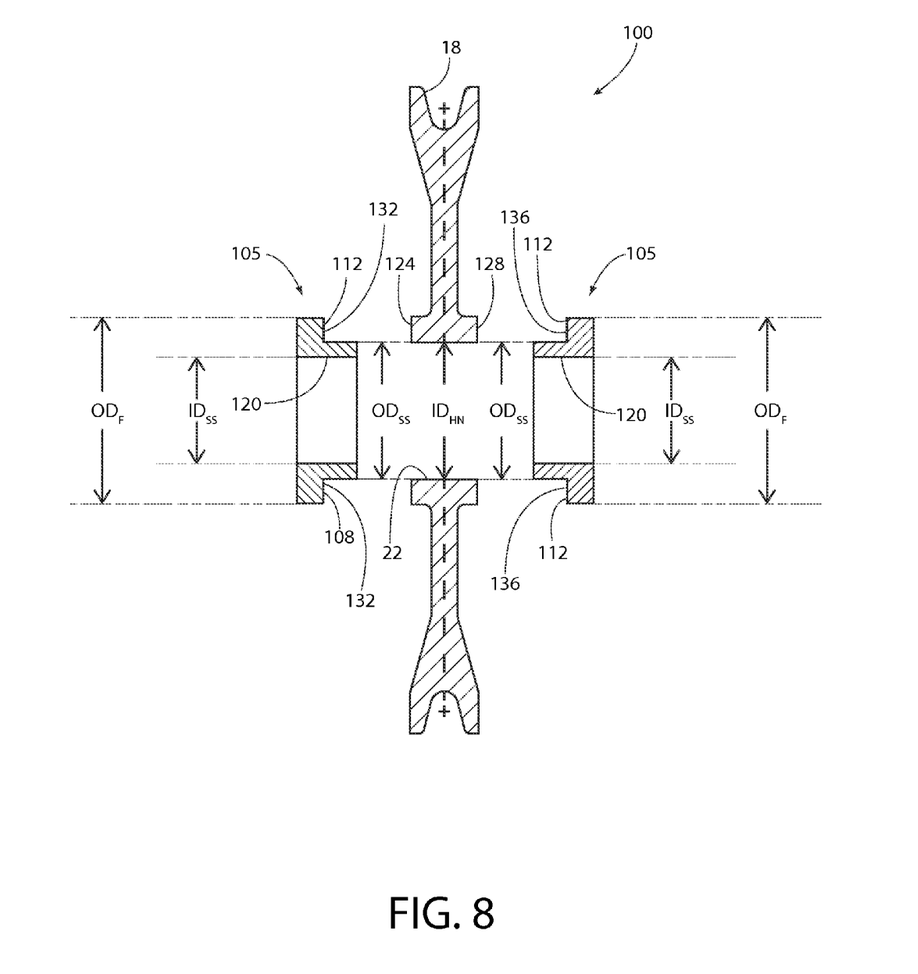
FIG. 8 is a cross-sectional view of the sheave from FIG. 5, with another embodiment of the two piece flanged adapter.
Figure 9:
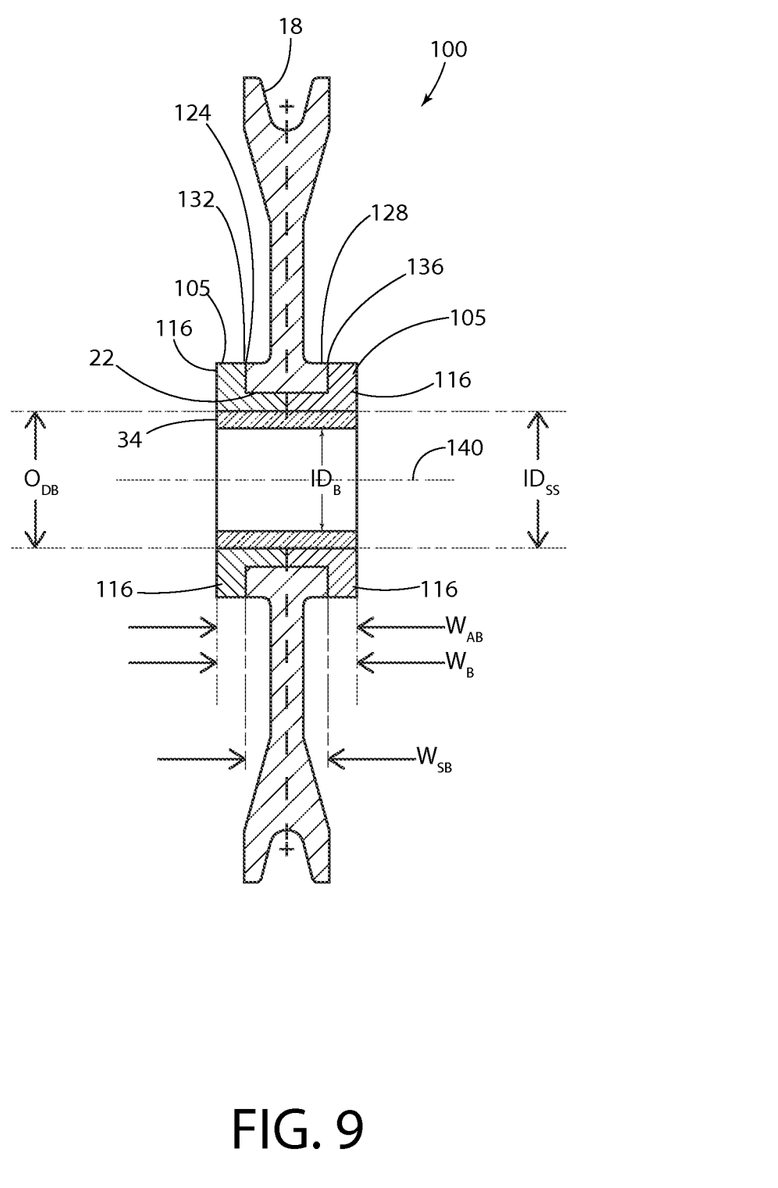
FIG. 9 is a cross-sectional view of the sheave from FIG. 5 with the two piece flanged adapter from FIG. 8 and a bearing installed in the sheave

FIG. 8 shows another embodiment of the two piece flanged adapter 105. In this embodiment, the adapter 105 will have a larger adapter bore width $W_{AB}$ than the adapter bore width of the adapter 104 shown in FIGS. 6 and 7. The bore width $W_{AB}$ is shown clearly in FIG. 9. FIG. 9 shows the two piece flanged adapter 105 installed in the sheave 100. The adapter has a bore width of $W_{AB}$, that is large enough to accommodate the bearing 34 width of $W_B$. The same sheave 100 can be used to accommodate different width bearings 34, all one needs are differently sized two piece flanged adapters 104, 105. One of the ordinary skill will appreciate that the two piece flanged adapter may be configured to have differing bore widths $W_{AB}$ to accommodate a variety of bearings with different widths. In addition, the two piece flanged adapter may be configured to have different inner diameters $ID_{SS}$ to accommodate a variety of bearings or bushings with different outer diameters $O_B$.

The disclosed sheave and sheave system has many advantages. The sheave has a narrow center in the sheave body. It then uses a two piece flanged adapter to set the hub bore and width. Each half of the adaptor is pressed in from opposite sides meeting in the middle. The flange thicknesses plus the center of the sheave body establish the hub width. Now a full range of hub bores and hub widths can be quickly configured to accommodate a large array of bearing types and sizes. The currently marketed range of bearing combinations immediately jumps from about 18 to about 59. There are also great manufacturing economies for large manufacturers producing a wide selection of wire rope sheaves. This production may be for internal consumption in construction of sheave blocks, sales as stand-alone sheaves or a combination of the two. With present sheave designs a manufacturer commits a sheave body to its final configuration at the initial machining operation—machining the hub bore and hub width. Once the sheave leaves this operation it can now be used for only one or two bearing configurations. If there are several end uses for a particular sheave body, each requires a different machining set-up and operation. By incorporating the invention into a manufacturing operation all sheaves of a given diameter can go through the initial machining operation in one batch. It is only at final assembly that a sheave body becomes locked in to a given bearing combination. Bearing selection is moved from the initial machining operation to the final assembly. Because any given adapter fits a full range of sheave bodies these can also be made in large quantities at a low cost. For volume manufacturing a simple bar machining operation can produce the finished part. Adapters might also be made of sintered powder metal, die casting or other methods. The adapters are pressed in at the same operation where the bearings are installed. A minute or two are added at this operation but a separate operation is not added to the assembly operation. A manufacturer gains added production flexibility by moving bearing selection from the first machining operation to the final sheave assembly. If a batch of 6" sheaves are slated to be used in bronze bushed snatch blocks for example and a customer request is received for a roller bearing snatch block before final sheave assembly, the switch to a roller bearing sheave is easily made. The roller bearing snatch block can be shipped in 2 to 3 days. Under present manufacturing procedures, fulfilling the request requires starting at the initial machining operation which requires a 3 to 4 week lead-time for the finished snatch block. This often leads to a loss of a potential order. Even if the order isn't lost, the customer has to wait and is likely to feel less than satisfied. If a manufacturer applies the advantages of this invention across a significant portion of his product line the superior delivery performance should lead to increased market share. The net result of this invention properly applied is lower costs and increased sales.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A sheave system comprising:
    a first grooved sheave, the first grooved sheave comprising:
        an outer diameter of a first value;
        a groove with a first groove size;
        a sheave bore with a bore diameter of a fourth value and a bore width of a fifth value;
        a sheave axis located in the center of the sheave bore;
        a first circumferential surface that generally encircles the sheave bore on one side of the first grooved sheave, and is generally orthogonal to the sheave axis;
        a second circumferential surface that generally encircles the sheave bore on an opposite side of the first grooved sheave, and is generally orthogonal to the sheave axis;
    a second grooved sheave, the second grooved sheave comprising:
        an outer diameter of a second value;
        a groove with a second groove size;
        a sheave bore with a bore diameter of the fourth value and a bore width of a sixth value;
        a sheave axis located in the center of the sheave bore;
        a third circumferential surface that generally encircles the sheave bore on one side of the second grooved sheave, and is generally orthogonal to the sheave axis;
        a fourth circumferential surface that generally encircles the sheave bore on an opposite side of the second grooved sheave, and is generally orthogonal to the sheave axis;
    a third grooved sheave, the third grooved sheave comprising:
        an outer diameter of a third value;
        a groove with a third groove size;
        a sheave bore with a bore diameter of the fourth value and a bore width of a seventh value;
        a sheave axis located in the center of the sheave bore;
        a fifth circumferential surface that generally encircles the sheave bore on one side of the third grooved sheave, and is generally orthogonal to the sheave axis;
        a sixth circumferential surface that generally encircles the sheave bore on an opposite side of the third grooved sheave, and is generally orthogonal to the sheave axis;
    a first two piece flanged adapter removeably and fixedly attached to any of the sheave bores of the first through third grooved sheaves, the two piece flanged adapter comprising:
        a first piece, the first piece comprising:
            a first piece adapter bore, with a first adapter bore inner diameter of $ID_{SS}$;
            a first inner flange that generally encircles the first piece adapter bore;
            a first inner flange surface;
        a second piece; the second piece comprising:
            a second piece adapter bore, with a second adapter bore inner diameter of $ID_{SS}$, and the second $ID_{SS}$ is equal to the first $ID_{SS}$;
            a second inner flange that generally encircles the second piece adapter bore;
            a second inner flange surface, wherein when the two piece flanged adapter is installable in any of the first through third sheave bores, the first inner flange surface abuts the first, third, or fifth circumferential surface, the second inner flange surface abuts the second, fourth, or sixth circumferential surface, and the first and second inner flange surfaces are orthogonal to the sheave bore axis, the first piece adapter bore abuts the second piece adapter bore and forms a single adapter bore, and the single adapter bore has a width of $W_{AB}$, and the two piece flanged adapter has an outer diameter of $OD_{SS}$, and $OD_{SS}$ is about equal to the fourth value.

2. The sheave of claim 1, wherein $W_{AB}$ is greater than the fifth value, the sixth value, and the seventh value.

3. The sheave of claim 1, wherein the fourth value is greater than $ID_{SS}$.

4. The sheave of claim 1, further comprising:
a bearing configured to be removeably and fixedly attachable to the inside of the single adapter bore, the bearing having an outer diameter of $OD_B$, and a width of $W_B$.

5. The sheave of claim 4, wherein the $OD_B$ is smaller than the fourth value, and the $OD_B$ is about equal to the $ID_{SS}$.

6. The sheave of claim 4, wherein the $W_B$ is larger than the fifth value, sixth value, and the seventh value, and the $W_B$ is about equal to $W_{AB}$.

* * * * *